Patented Nov. 3, 1942

2,300,948

UNITED STATES PATENT OFFICE 2,300,948

COMPOSITION AND METHOD (PLANT STIMULANT)

John F. Lontz, Wilmington, Del., assignor to E. I. du Pont de Nemours & Company, Wilmington, Del., a corporation of Delaware No Drawing. Application March 11, 1941, Serial No. 382,751

20 Claims. (Cl. 47—58)

This invention relates to plant stimulants and is particularly directed to plant stimulant compositions containing as an essential active ingredient a compound selected from the class consisting of naphthylalkanols and naphthylalkanethiols and to methods in which the growth characteristics of plants are modified by application of these compounds.

In the science of phytology, or plant physiology, it is universally recognized that certain factors regarded as growth regulators or growth-promoting substances, both naturally occurring and synthetic, are responsible for the fundamental and directive development of plant life. These plant growth substances, also known as auxins, plant hormones, plant growth stimulants, and referred to herein simply as "plant stimulants," in very minute quantities promote and control the growth of the plant cell, a property which can be determined qualitatively and quantitatively by such standard test procedures known as the *Avena coleoptile* curvature test of Boysen-Jensen ("Growth Hormones in Plants." Translated and revised by G. S. Avery, Jr., and P. R. Burkholder, McGraw-Hill, New York), the Avena cylinder or straight growth test of Thimann (Proc. Acad. Sci. Amsterdam, vol. 38, p. 896–912 (1935)), the split pea stem curvature test of Went (Proc. Acad. Sci. Amsterdam, vol. 37, p. 547 (1934)), and the green tissue test of Hitchcock and Zimmerman (Contributions from Boyce-Thompson, vol. 9, No. 5, p. 463–518 (1938)).

While fundamentally these substances control the development of the cell, particularly its elongation and division, the total or superficial responses to these substances are manifested in such various ways as inducing nastic movement, bending and swelling, proliferation, and overgrowth of leaves and stems, control of root growth, development of callous tissue, increased cambial activity, and deposition of new cell wall and abscission tissue, and the initiation of new roots on stems and leaves. The practical aspects of these properties include propagation of plants from cuttings, hastening of flower bud formation, "hormonization" of cereal grains for controlling germination and growth, parthenogenic development of fruit, and delaying or controlling the fall of leaves, buds and fruit.

In the successful application of plant stimulants to various of these purposes it is important that the concentration of the compound in a suitable treating medium and the time of treatment, both of which, particularly with some compounds, are highly critical, be adjusted carefully. If this concentration/time factor is exceeded by using either a higher concentration or longer treating time the stimulating effect may vanish and instead considerable injury to the plant develop.

Of the various types of known plant stimulants, an adequate summary of which may be found in U. S. Patent 2,220,505, 1-naphthaleneacetic acid has probably obtained the most significance in the art. In the basis of cost efficiency and ease of synthesis it appears to be most outstanding, yet its synthesis is by no means simple and its range of tolerance is too sharp to provide sufficient margin of safety in the hands of unskilled workmen.

I have now found that the naphthylalkanols and the naphthylalkanethiols have plant stimulating properties and may be used in various types of compositions and may be applied in different manners to modify growth characteristics of plants.

As compared with the prior art, compounds of my invention are safe, effective and readily available. They may be prepared by simpler and more efficient synthesis, and when applied in proper concentrations have the same order of effectiveness and in some cases even greater effectiveness. They have a favorable margin of safety. and may be applied in higher concentrations without deleteriously affecting the plants.

The compounds of this invention are aliphatic alcohols and the corresponding sulfur analogues in which a hydrogen is replaced by an aromatic radical of the naphthalene series. They may be represented by the formula N—R—XH in which N is an aromatic radical of the naphthalene series and R is a bivalent aliphatic hydrocarbon radical, and X is either sulfur or oxygen. Preferably the radical N is a beta substituent on the "R" radical with respect to "—XH," in which case R must have at least two carbon atoms. Also, it is preferable that the radical R occupy the 1- or alpha position of the naphthalene ring. These compounds may be prepared in any suitable manner, for example, as described by Ruzicka et al., Helv. Acta Chim. 16, 836 (1933) which describes the preparation of beta-1-naphthylethanol, and Sontag, Ann. Chim. (11) 104, 429 (1934) which describes the preparation of an aryl ethylmercaptan (phenylethylmercaptan) by the reaction of potassium hydrosulfide with the corresponding halide. Suitable compounds include beta-1-naphthylethanol, beta-1-naphthylethanethiol, beta-1-naphthylpropanol, beta-1-naphthylpropanethiol, alpha-ethyl-beta-1-naphthylethanol, alpha-ethyl-beta-1-naphthylethanethiol, 2-(1-naphthyl)-cyclohexanol, 2-(1-naphthyl)-cyclohexanethiol, beta-2-naphthylethanol, and gamma-2-naphthylpropanol.

The compounds of this invention may be used in a variety of ways as stimuli to modify the growth characteristics of plants. For example, they may be applied to seeds to stimulate root and plumule development or to stimulate germination. They may be applied to cuttings, transplants or tubers to stimulate root formation, or they may be applied to intact plants to prevent premature drop of fruit of foliage. They may induce parthenogenesis. In their various applications they may be used on seeds or mature plants to regulate the development of the plants when desired to avoid drought, frost and other adverse conditions, or to stimulate root activity in cuttings or transplanted plants or to modify the abscission cells to prevent premature drop of buds, leaves, and fruit, particularly apples. In all their applications they are applied to living plant cells in such concentrations as will alter the growth characteristics of the plant. In the application to seeds it is not known whether the action is to modify the seed per se or the plant which develops from the seed, and for the purpose of this invention it will be understood that the term "plant" as used herein and in the appended claims is intended to include seeds.

In the application of the compound for these various purposes different compositions may be employed. For the most part aqueous solutions will be found most desirable. These solutions may include wetting agents or adhesives, or both. Colloidal materials such as the soluble gums or resins may be included; also, water-soluble polymers such as polyvinyl alcohol. The compounds also may be applied in admixture with other diluents either as pastes or dusts. Thus the materials may be incorporated in oils, fats, or similar vehicles such as lanolin, or in a finely divided inert such as talc, flour, fuller's earth, clay or other soluble or insoluble, finely divided solids.

The effectiveness of the compounds of this invention will vary according to the individual characteristics, according to the type of plant structure treated, according to the purpose of the treatment and according to the vehicle from which the application is made. In applying material from aqueous solutions, for example, the effective concentration is considerably lower than when the material is applied from a dust. Thus, in propagating plants from cuttings the basal ends of the cuttings may be dipped in a dust containing from 0.5 to 5 per cent active ingredient, depending upon the type of plants used, or in an aqueous solution containing from 3 to 200 mgs. per liter, normally 10 to 100 mgs., being sufficient, depending upon the plant used and the time of treatment. Thus heavy rooting response has been obtained by soaking carnation cuttings for 3½ hours at room temperature in aqueous solutions containing 60 mgs. per liter of beta-1-naphthylethanol or beta-1-naphthylethanethiol. In other applications different concentrations may be found most suitable. In applying a dusting treatment to seeds concentrations between 0.5 and 5 per cent are generally sufficient, and in aqueous solutions the concentration may range from 3 to 200 mgs. per liter. In the application to mature plants concentrations from 10 to 200 grams per 100 gallons of water, or in the case of a dust from 2 to 100 parts per 100,000, can be used. It will readily be understood, however, that in some cases either higher or lower concentrations may be necessary.

While I have disclosed my invention with reference to particular applications it is to be understood that it is not limited in these respects but is directed to the application of the particular stimulant described in any manner which leads to alteration of the growth characteristics of plants. The general characteristic of a plant stimulant is that of modifying the development of the plant, not simply as in the case of a fertilizer by providing a more proper food but actually by altering the growth characteristics of the plant in the various ways already set forth, nor are they to be confused with plant poisons which simply alter and destroy. Additionally, the plant stimulant is effective in minute amounts, the effective concentration being easily set forth in parts per million or milligrams per liter.

Since many widely differing embodiments of the invention may be made it is to be understood that such modifications as come within the spirit of the invention are intended to be included within the scope of the claims.

I claim:

1. A plant stimulant composition containing as an essential active ingredient an alcohol selected from the class consisting of aliphatic alcohols and aliphatic thio-alcohols having a hydrogen replaced by an aromatic radical of the naphthalene series.

2. A plant stimulant composition containing as an essential active ingredient a compound selected from the class consisting of naphthylalkanols and naphthylalkanethiols.

3. A plant stimulant composition containing as an essential active ingredient a compound having the formula N—R—XH in which N is an aromatic radical of the naphthalene series, R a bivalent aliphatic hydrocarbon radical, and X is selected from the group consisting of oxygen and sulfur.

4. A plant stimulant composition containing as an essential active ingredient a compound having the formula N—R—XH as defined in claim 3 in which the radical R contains at least two carbon atoms, the radical N is attached to the beta carbon atom, and the radical R occupies the 1-position of the naphthalene ring.

5. A plant stimulant composition containing as an essential active ingredient a substance selected from the class consisting of 1-naphthylethanols and 1-naphthylethanethiols.

6. A plant stimulant composition containing as an essential active ingredient a 1-naphthylethanethiol.

7. A plant stimulant composition containing as an essential active ingredient a 1-naphthylethanol.

8. A plant stimulant composition containing as an active ingredient a compound selected from the class consisting of 1-naphthylethanethiol and 1-naphthylethanol.

9. A plant stimulant composition containing as an active ingredient 1-naphthylethanethiol.

10. A plant stimulant composition containing as an active ingredient 1-naphthylethanol.

11. In the propagation of plants the method altering the growth characteristics of the plant which comprises treating the plant with a plant stimulant composition containing as an essential active ingredient an alcohol selected from the class consisting of aliphatic alcohols and aliphatic thio-alcohols having a hydrogen replaced by an aromatic radical of the naphthalene series.

12. In the propagation of plants the method altering the growth characteristics of the plant which comprises treating the plant with a plant stimulant composition containing as an essential active ingredient a compound selected from the class consisting of naphthylalkanols and naphthylalkanethiols.

13. In the propagation of plants the method altering the growth characteristics of the plant which comprises treating the plant with a plant stimulant composition containing as an essential active ingredient a compound having the formula N—R—XH in which N is an aromatic radical of the naphthalene series, R a bivalent aliphatic hydrocarbon radical, and X is selected from the group consisting of oxygen and sulfur.

14. In the propagation of plants the method altering the growth characteristics of the plant which comprises treating the plant with a plant stimulant composition containing as an essential active ingredient a compound having the formula N—R—XH as defined in claim 3 in which the radical R contains at least two carbon atoms, the radical N is attached to the beta carbon atom, and the radical R occupies the 1-position of the naphthalene ring.

15. In the propagation of plants the method altering the growth characteristics of the plant which comprises treating the plant with a plant stimulant composition containing as an essential active ingredient a substance selected from the class consisting of 1-naphthylethanols and 1-naphthylethanethiols.

16. In the propagation of plants the method altering the growth characteristics of the plant which comprises treating the plant with a plant stimulant composition containing as an essential active ingredient a 1-naphthylethanethiol.

17. In the propagation of plants the method altering the growth characteristics of the plant which comprises treating the plant with a plant stimulant composition containing as an essential active ingredient a 1-naphthylethanol.

18. In the propagation of plants the method altering the growth characteristics of the plant which comprises treating the plant with a plant stimulant composition containing as an active ingredient a compound selected from the class consisting of 1-naphthylethanethiol and 1-naphthylethanol.

19. In the propagation of plants the method altering the growth characteristics of the plant which comprises treating the plant with a plant stimulant composition containing as an active ingredient 1-naphthylethanethiol.

20. In the propagation of plants the method altering the growth characteristics of the plant which comprises treating the plant with a plant stimulant composition containing as an active ingredient 1-naphthylethanol.

JOHN F. LONTZ.